United States Patent
Radatti et al.

(10) Patent No.: US 7,389,540 B2
(45) Date of Patent: *Jun. 17, 2008

(54) APPARATUS AND METHODS FOR INTERCEPTING, EXAMINING AND CONTROLLING CODE, DATA AND FILES AND THEIR TRANSFER

(75) Inventors: Peter V. Radatti, Conshohocken, PA (US); Timothy R. Eliseo, Fair Oaks, CA (US)

(73) Assignee: CyberSoft, Inc., Conshohocken, PA (US)

( * ) Notice: Subject to any disclaimer, the term of this patent is extended or adjusted under 35 U.S.C. 154(b) by 332 days.

This patent is subject to a terminal disclaimer.

(21) Appl. No.: 09/800,314

(22) Filed: Mar. 6, 2001

(65) Prior Publication Data

US 2001/0042214 A1  Nov. 15, 2001

Related U.S. Application Data

(63) Continuation-in-part of application No. 09/244,154, filed on Feb. 3, 1999, now Pat. No. 6,763,467.

(51) Int. Cl.
*G06F 21/00* (2006.01)
*G06F 15/16* (2006.01)
*G06F 11/30* (2006.01)

(52) U.S. Cl. .................. 726/24; 713/188; 713/189; 709/224

(58) Field of Classification Search .......... 713/200, 713/201, 151–152, 154, 188; 709/223–225, 709/226, 227–232
See application file for complete search history.

(56) References Cited

U.S. PATENT DOCUMENTS

| 5,070,528 | A | * | 12/1991 | Hawe et al. ................. 713/161 |
| 5,126,728 | A |   | 6/1992  | Hall |
| 5,278,901 | A |   | 1/1994  | Shieh et al. |
| 5,319,776 | A |   | 6/1994  | Hile et al. |
| 5,414,833 | A |   | 5/1995  | Hershey et al. |
| 5,440,723 | A | * | 8/1995  | Arnold et al. ................. 714/2 |
| 5,473,769 | A | * | 12/1995 | Cozza ......................... 714/39 |
| 5,481,735 | A |   | 1/1996  | Mortensen et al. |
| 5,511,163 | A |   | 4/1996  | Lerche et al. |
| 5,550,984 | A |   | 8/1996  | Gelb |
| 5,586,266 | A |   | 12/1996 | Hershey et al. |
| 5,623,600 | A |   | 4/1997  | Ji et al. |
| 5,682,428 | A |   | 10/1997 | Johnson |
| 5,761,424 | A |   | 6/1998  | Adams et al. |
| 5,802,178 | A |   | 9/1998  | Holden et al. |

(Continued)

OTHER PUBLICATIONS

Redmond, T., "The Great Anti Virus Crusade", *Windows 2000 Magazine* (Apr. 2001) pp. 1-4.

(Continued)

*Primary Examiner*—Christopher Revak
(74) *Attorney, Agent, or Firm*—John F. A. Earley, III; Frank J. Bonini, Jr.; Harding, Earley, Follmer & Frailey, P.C.

(57) ABSTRACT

The present invention comprises apparatus and methods for processing code, that is, for intercepting, examining and/or controlling code streams in a network. A protocol parser is implemented in order to intercept the code as it passes through the channel and transfer the code to a proscribed code scanner. Embodiments for various platforms, including Unix® and Windows® NT are disclosed.

15 Claims, 3 Drawing Sheets

U.S. PATENT DOCUMENTS

| | | | |
|---|---|---|---|
| 5,832,208 A | 11/1998 | Chen et al. | |
| 5,832,228 A | 11/1998 | Holden et al. | |
| 5,881,151 A * | 3/1999 | Yamamoto | 713/200 |
| 5,889,943 A | 3/1999 | Ji et al. | |
| 5,916,305 A | 6/1999 | Sikdar et al. | |
| 5,931,917 A | 8/1999 | Nguyen et al. | |
| 5,983,348 A | 11/1999 | Ji | |
| 5,987,610 A | 11/1999 | Franczek et al. | |
| 6,009,525 A | 12/1999 | Horstmann | |
| 6,021,510 A * | 2/2000 | Nachenberg | 714/38 |
| 6,067,410 A * | 5/2000 | Nachenberg | 703/28 |
| 6,088,803 A | 7/2000 | Tso et al. | |
| 6,178,505 B1 | 1/2001 | Schneider et al. | |
| 6,334,189 B1 | 12/2001 | Granger et al. | |
| 6,356,951 B1 | 3/2002 | Gentry, Jr. | |
| 6,357,008 B1 | 3/2002 | Nachenberg | |
| 6,389,534 B1 | 5/2002 | Elgamal et al. | |
| 6,393,568 B1 * | 5/2002 | Ranger et al. | 713/188 |
| 6,421,733 B1 | 7/2002 | Tso et al. | |
| 6,549,937 B1 | 4/2003 | Auerbach et al. | |
| 6,577,920 B1 | 6/2003 | Hypponen et al. | |
| 6,697,950 B1 | 2/2004 | Ko | |
| 6,721,424 B1 | 4/2004 | Radatti | |
| 6,763,467 B1 * | 7/2004 | Radatti et al. | 726/24 |
| 6,851,057 B1 | 2/2005 | Nachenberg | |
| 2002/0004819 A1 | 1/2002 | Agassy et al. | |
| 2002/0007453 A1 | 1/2002 | Nemovicher | |
| 2002/0073323 A1 | 6/2002 | Jordan | |
| 2003/0131061 A1 | 7/2003 | Newton et al. | |
| 2004/0143763 A1 * | 7/2004 | Radatti | 713/201 |
| 2004/0230840 A1 * | 11/2004 | Radatti | 713/201 |

OTHER PUBLICATIONS

Afzal, Motorola PowerPC Migration Tools—Emulation and Translation, 1996, IEEE, p. 145.

Microsoft Computer Dictionary third edition, 1997, p. 355.

PixelFusion Processor Now Hunting Network Apps, May 17, 200, p. 1-2.

* cited by examiner

APPARATUS AND METHODS FOR INTERCEPTING, EXAMINING AND CONTROLLING CODE, DATA AND FILES AND THEIR TRANSFER

CROSS-REFERENCE TO RELATED APPLICATIONS

This application is a continuation-in-part of co-pending U.S. Ser. No. 09/244,154, entitled "NETWORK TRAFFIC INTERCEPTING METHOD AND SYSTEM," filed on Feb. 3, 1999, by Peter V. Radatti and David J. Harding, issued on Jul. 13, 2004 as U.S. Pat. No. 6,763,467, which disclosure is incorporated herein by reference; and is related to co-pending application Ser. No. 09/800,314, entitled "APPARATUS AND METHODS FOR INTERCEPTING, EXAMINING AND CONTROLLING CODE, DATA AND FILES AND THEIR TRANSFER," filed on Mar. 6, 2001, by Peter V. Radatti and Timothy R. Eliseo, which disclosure is incorporated herein by reference.

FIELD OF THE INVENTION

The present invention relates to apparatus and methods for intercepting, examining and controlling code, data and files and their transfer. More particularly, the present invention relates to apparatus and methods for intercepting, examining and controlling proscribed or predetermined code, data and files and their transfers.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Some of these hostile algorithms are viruses, worms, and Trojan horses.

Hostile, malicious and/or proscribed code, data and files ("code" as used hereinafter generally includes "data" and "files") can infect a single computer system or entire network and so posit a security risk to the computer system or network. The user and/or administrator (generally referred to hereinafter as "user") may wish to intercept, examine and/or control such code. The user might also wish to intercept, examine and/or control other code as well, for example, code which the user does not know to be hostile, but wishes to intercept nonetheless, for example, potentially sexually or racially harassing email, junk email, etc. This latter type of code is known hereinafter as "predetermined code".

Antivirus or other similar packages attempt to protect the system or network from hostile, malicious, predetermined and/or proscribed code (generally referred to hereinafter as "proscribed code.") VFIND®, from CyberSoft, Inc., is one such product that protects systems and networks from proscribed code. Any programs standing alone, such as VFIND®, must be run by the user, however, and run frequently, otherwise the protections offered by the programs are lost. Also, these programs is do not generally intercept proscribed code as the code is transferred from machine to machine, nor do these programs protect against hostile or unauthorized access to a machine or network.

A firewall is generally used to intercept proscribed code or protect against hostile or unauthorized access. When a firewall is installed, communications are routed through the firewall, and the firewall determines whether particular code is authorized to pass to the internal network. Firewalls have a number of disadvantages. A firewall must be placed at a "choke point" at which a network (an "internal" network) interfaces with one or more other networks (an "external" network.) Although placement of a security device at a choke point is proper practice, because all traffic must travel through the choke point, the firewall becomes a potential central point of failure: if the firewall fails, the entire connection to the network fails. Additionally, the firewall will usually add latency to the connection by performing its function. This firewall latency often degrades, linearly or logarithmically, the bandwidth such that all available bandwidth cannot be utilized. Also, since a firewall does not exist between the users on the internal network, a user can attack the internal system. It is an observation within the security industry that 80% of all attacks against a system originate on the internal network while only 20% of attacks originate from an external network.

Accordingly, because of these and other known disadvantages, firewalls alone cannot provide efficient, effective, and transparent protection for any machine or network.

Therefore, it would be beneficial to have an automatic system and method for simply and effectively scanning incoming and outgoing code in an efficient and effective manner transparently or almost transparently to the end-user, with little or no operational effort required by the user.

Accordingly, it is an object of the present invention to provide apparatus and methods that intercept, control, and/or examine code.

It is yet another object of the present invention to provide apparatus and methods that simply and effectively intercept, control, and/or examine incoming and outgoing code in an efficient and effective manner transparently or almost transparently to the enduser, with little or no operational effort required by the user.

SUMMARY OF THE INVENTION

The present invention comprises apparatus and methods for intercepting, examining, and controlling code. The present invention may operate on a single computer system or multiple systems depending on the operating system and other variables. The present invention may, in various embodiments, process, that is, intercept, examine, and/or control any or all code streams in a computer or network. Intercepting, examining and/or controlling code includes but is not limited to monitoring, blocking, logging, quarantining, discarding or transferring code.

Although the present invention can be implemented on various platforms, the preferred embodiments are used in Unix® and various Windows® environments, such as NT, 2000, 95, 98 and Me.

The preferred embodiments monitor transfers from a system using a protocol parser which may be placed on the client system, the server system, or other intermediate system or component. In the especially preferred Unix® embodiments, the protocol parser is a Unix® STREAMS module and driver activated when an application opens a STREAMS device of the proper type. In the especially preferred Windows® NT embodiments, the protocol parser is a WinNT driver activated when an application opens a communications channel.

In the especially preferred embodiments, the protocol parser is placed so as to intercept code passing through the channel which uses the TCP protocol. Other possible parameters in the especially preferred embodiments include interception of code traveling through specific TCP port numbers, or code traveling in specific directions (e.g. from an external network to internal network). In other embodiments, any code parameters known in the art may be used as interception parameters.

If the configuration and parameters of the intercept module result in code interception, the code is sent by the parser to a protocol scanner. The protocol scanner in turn reviews the code it has received from the parser. Depending upon its configuration, which in the preferred embodiment include port interception designation, file type interception designation, and other parameters, the protocol scanner will pass some, all, or none of the code flowing through it to a proscribed code scanner. This proscribed code scanner may be an antivirus scanner, pattern scanner, and/or content scanner or other types. This proscribed code scanner, depending on its settings, may pass some, all or none of the code passing through it.

If the code passing through the intercept module is not intercepted, that is, passed to the protocol scanner, it is returned to the communications channel. Similarly, if the code passing through the protocol scanner is not intercepted, that is, passed to the proscribed code scanner, it is returned to the communications channel.

Thus, the embodiments of the present invention process code by intercepting or diverting code from a communication channel, processing it, and then reintroducing it (or not as desired) into that channel. By intercepting or diverting code from a communication channel, the preferred embodiments do not change the nature of the communication, and process code transparently to the applications, unless a problem is discovered. In that case, the preferred embodiments may, if desired, be configured to notify the application and/or the user notified, among other actions.

DETAILED DESCRIPTION OF THE PREFERRED EMBODIMENTS

Figure 1:
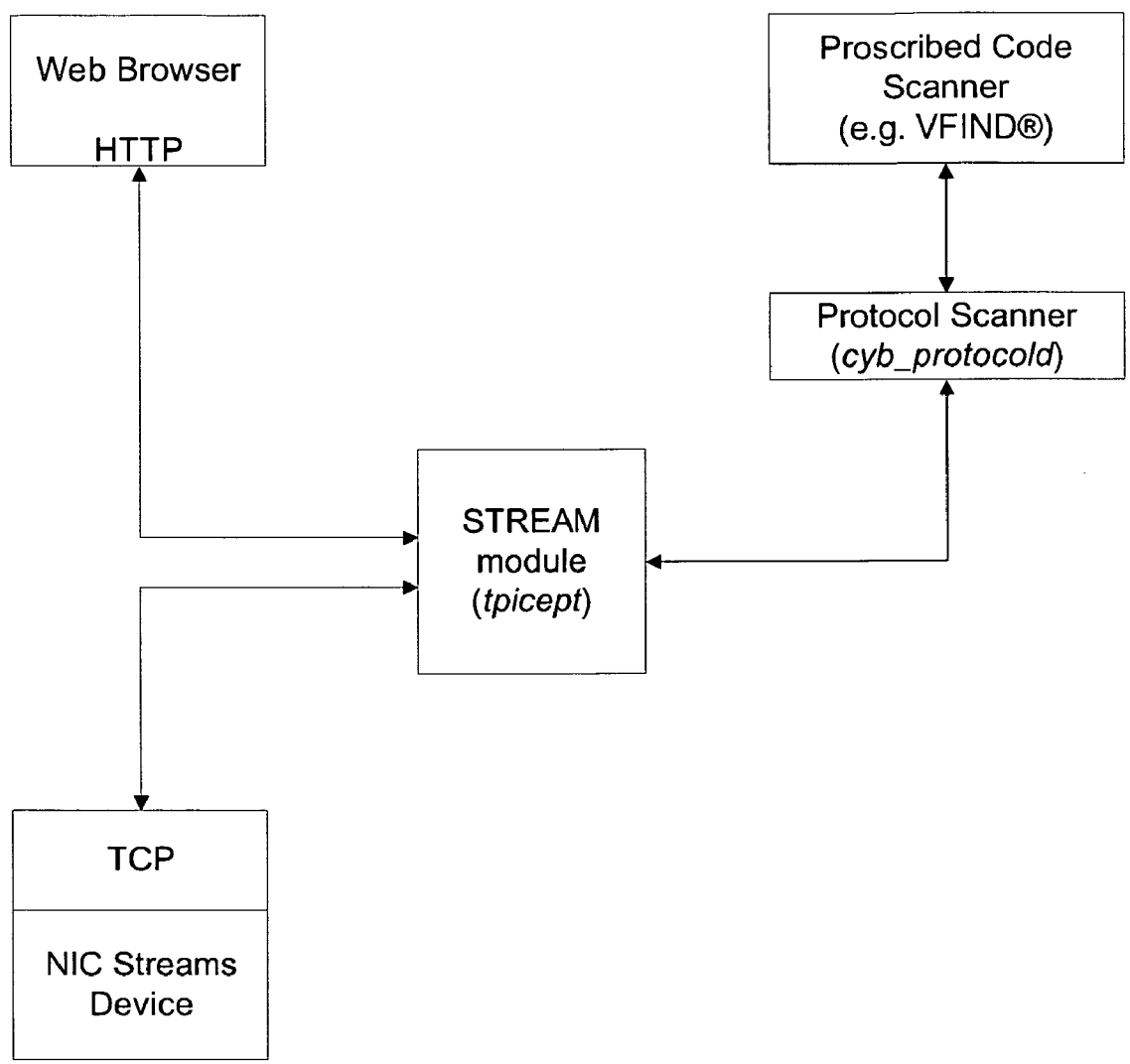
FIG. 1 is a schematic diagram of operation of a preferred embodiment.

The preferred embodiments process code. The preferred embodiments process, that is, intercept, examine, and/or control any or all code streams transferred through any number of connections in a computer or network. Intercepting, examining and/or controlling code includes but is not limited to monitoring, blocking, logging, quarantining, discarding or transferring code.

A preferred embodiment of the present invention runs on a Unix® platform that supports STREAMS such as System V, Sun Solaris®, IBM AIX®, HP-UX®, etc. The use of STREAMS in this embodiment promotes ease of installation and use. For example, installation on a computer of this STREAMS embodiment means the Unix® kernel on the computer would not have to be recompiled as might be the case with a non-STREAMS embodiment.

The following description of the embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® NT, Windows® 2000, Windows® 95, 98 and Me, IBM OS/390, MacOS, VxWorks® and others.

The preferred embodiment is comprised of both platform dependent and platform independent code as well, thus increasing portability and simplifying porting to new platforms. Generally, the embodiments will comprise both types of code although it is possible and within the scope of the present invention to construct an embodiment wholly in platform dependent code. Similarly it is possible and within the scope of the present invention to construct an embodiment wholly in platform independent code.

The preferred embodiments that run in a Unix®-STREAMS environment are generally invisible. At least part of those embodiments operate within the Unix® kernel, and so a brief review of the operation of the kernel would be helpful to understanding those embodiments.

The Unix® kernel is the operating system. The kernel is invisible to the user yet controls the system resources and hardware. For example, the user may want to use a telecommunications program in order to call another computer. She opens the program and instructs the program to call a mainframe. The program in turn issues a call to the kernel to open the communications device, in this case a serial port device. The kernel receives the call and looks up the device in its character device switch table. The character device switch table provides the kernel with the appropriate device specific routine: in this case an open call. Subsequent commands from the program will be similarly interpreted by the kernel.

In a Unix®-STREAMS platform, any specific devices with a STREAMS implementation (a STREAMS device) have a special field in the character device switch table that points to a streams initialization structure. Opening the STREAMS device will open the STREAMS device driver as well as create a Stream head to access the device driver. One or more STREAMS modules may be inserted between the STREAMS device and Stream head. STREAMS modules can process code passing through the Stream, If, for example, taking the above example regarding the opening of a telecommunications program, the user opens her program in a Unix®-STREAMS environment with a STREAMS serial port device, when the program calls the kernel to open the serial port device, a STREAMS serial port device driver will be opened and a Stream head will be created. A STREAMS module may be inserted as well depending on the configuration of that particular Stream. STREAMS modules are generally inserted into the Stream automatically through use of an "autopush" list which is referred to by the kernel when a Stream is opened.

Returning now to the description of the preferred embodiments, installation of this embodiment begins with installing tpicept, a kernel module, in an appropriate directory or directories, in order to provide the module to the kernel when called. In the especially preferred embodiments, tpicept will provide both a STREAMS module as well as a STREAMS device driver to the system as is discussed in further detail below. tpicept is linked to a number of path names, so that the file can be called by a number of names and used in a number of ways, e.g., links are established in /usr/kernel/drv and /usr/kernel/strmod so that the file may be used both as a STREAMS driver and STREAMS module. The protocol scanner cyb_protocold and the proscribed code scanner are also installed at this time in appropriate directories, e.g., /usr/s/bin.

When installing the preferred embodiments, the "old" or existing autopush lists for the TCP protocol layer is deleted and a new list containing the STREAMS module tpicept is added. Thus tpicept will be pushed onto the stream that is created when a TCP streams device is opened.

The embodiments may be started by any of a number of manners as is known in the art. For example, no separate procedure is necessary to start the operation of the kernel module tpicept. It operates as soon as called. The other major components, the protocol scanner and the proscribed code scanner, may be made operational through an executable file. The configuration of the preferred embodiments also allows for loading on startup of the system. Of course, other embodiments may load when desired by the user. However, loading upon start-up limits user tampering with the security procedures which may be desirable for network administration.

Once installed, the embodiment is operational. The embodiment remains in the system until a STREAMS device that the embodiment has been configured to intercept is opened. The especially preferred embodiments intercept code at the TCP layer, however, the Unix® embodiments of the present invention are not limited to interception at the TCP layer. Rather, the Unix® embodiments of the present invention can intercept., examine and/or control code in any Stream. Of course, other embodiments, on other platforms, may also intercept code at other locations on a communications channel or layers in a communications stack.

FIG. 1 shows an example of a process of a preferred embodiment. Code passing back and forth between the Web browser and the NIC STREAMS device is being intercepted at the HTTP—TCP interface by the STREAMS module tpicept. tpicept, may or may not transfer the code to a protocol scanner, cyb_protocold, depending upon, in this embodiment, specific configurations that include port interception settings. (The dashed line in the figure shows this optional transfer.) For example, if tpicept has been configured so as to only intercept TCP communications on port 80 (usually HTTP), only code passing through port 80 will be sent to cyb_protocold. Code traveling though another port (e.g., through SMTP on port 25 from a mail application) will be returned to the communication stack.

The STREAMS module may also be configured by varying its insertion at any particular data communications layer and/or protocol. In this embodiment, the module is inserted to intercept code at the upstream side of TCP. The STREAMS module has been inserted here in this embodiment because TCP is a multiplexer for different applications and connections, including those applications and connections to the Internet. Thus, this embodiment intercepts traffic at a "choke point" of the system. Of course, in other embodiments, other protocols and/or other layers may be intercepted as desired.

Returning to FIG. 1, if tpicept intercepts the code according to its configuration, it sends the code (through a STREAMS queue pair not shown here) to the protocol scanner, cyb_protocold. Cyb_protocold then may transfer the code to the proscribed code scanner through interprocess communication, e.g., a socket. (The dashed line in the figure shows this optional transfer.) The decision by cyb_protocold to transfer the code depends upon its configuration settings and these settings can be varied as desired in this embodiment. For example, the scanner may be configured to intercept code on specific TCP ports such as SMTP (usually port 25) or HTTP (usually port 80) (As should be clear, both the protocol scanner and the STREAMS module can be configured by port interception settings); may be configured to intercept certain file types such as *.exe files; etc. As another example, the protocol scanner could be configured as a protocol dependant scanner, that is, to presume that traffic on particular port will always be a certain protocol. Those ports which have not been configured for interception by this embodiment will pass traffic transparently. Alternatively, "protocol independent" scanning, that is, scanning by ignoring the actual port used, could be configured. Protocol independent scanning provides a higher level of security and may be desirable in some cases when non-standard ports are used for well-known protocols (HTTP is the most common example of this).

If the code is not sent by the protocol scanner to the proscribed code scanner, it is returned to the STREAMS module, and then to the Stream.

If the code is sent by the protocol scanner to the proscribed code scanner, the proscribed code scanner analyzes the code according to its configuration settings. These settings can take numerous forms, including scanning for specific proscribed code or code segments, calculating hash codes of the code or code segment and then scanning a database of proscribed hash codes, etc. If the code is acceptable, the proscribed code scanner provide an indicator to cyb_protocold which in turn wilt send the code back through tpicept and from there back to the communication stream In this case, the process will have been transparent, that is, the interception process will not have disturbed the application. Thus, this embodiment has minimal impact on the performance of the computer and networking connections.

If the code is not acceptable, the proscribed code scanner will indicate the code is not acceptable. In the especially preferred embodiments, that indication will be sent directly to the user and/or the application. In other embodiments, the indicator may result in access to the code being denied; in extracting the proscribed code from the remainder; in quarantining and saving or transferring the proscribed code for analysis or deleted; the proscribed code could be modified; the proscribed code could be sent to an administrator or security department or firm; etc.

Figure 2:
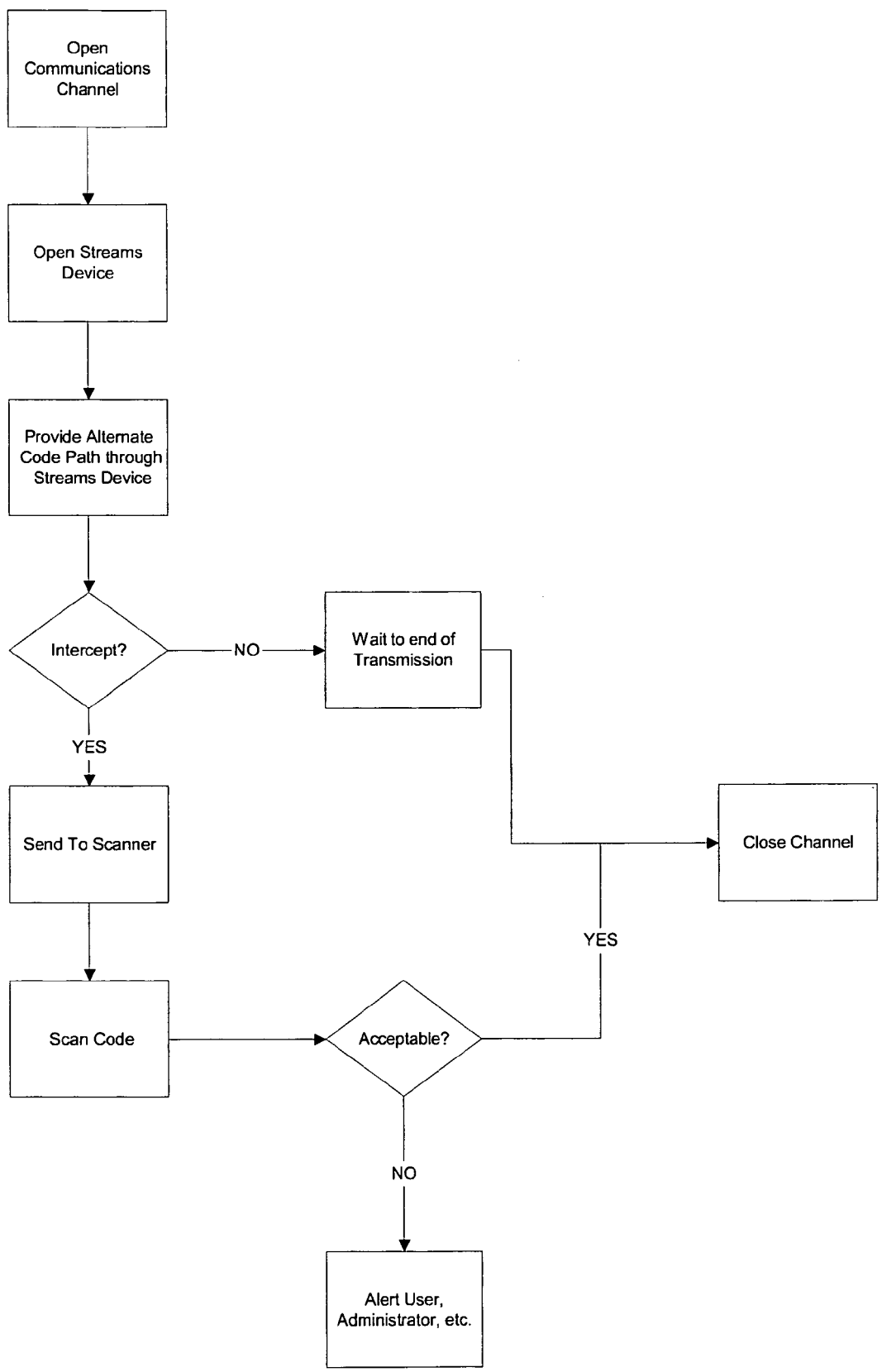
FIG. 2 is a schematic diagram of operation of a preferred embodiment.

The process of this embodiment is shown generally at FIG. 2.

It should be noted that more than one instance of the embodiment will be utilized if the user has more than one application running and/or more than one communications channel opened. For example, if a user opens a sendmail and network card communication channel and a Netscape Navigator® and a modem communication channel, two code streams will be created, both using TCP. Both will be intercepted according to the process of the preferred embodiments. Moreover, if channels are opened using other protocols at the Transport layer, or other protocols at other layers, embodiments of the present invention can be used to intercept those communications, with an appropriate kernel module.

Of course, any configuration parameters are not limited to predetermined parameters. For example, the interception parameters of the intercept module, protocol scanner and the proscribed code scanner may be configured in various ways in various embodiments. Moreover, the user may configure and reconfigure the parameters as desired. In yet other embodiments, there may need to be no interception parameters or no predetermination of interception parameters. For example, a user may decide to intercept all code, or the embodiment could request parameters as code is being transferred or could request an interception decision as the code is being transferred. Of course, in yet other embodiments, the choice of predetermined, non predetermined, or no interception parameters, and what parameters to change could be offered to either or both end-users or network administrators.

Of course, other embodiments may be configured differently. For example the protocol scanner may be written as one or more STREAMS modules, and the connections to and from the intercept module and the proscribed code scanner would be modified appropriately.

Another especially preferred embodiment is written for the Windows® NT platform. In this NT embodiment, installation of this embodiment begins with installing csiservice.exe in an appropriate directory or directories, e.g., WinNT\System32\, as well as csitcpip.sys, an NT driver, in an appropriate directory or directories (usually, WinNT\System32\drivers). csiservice.exe provides the driver to the system when called. The protocol scanner and the proscribed code scanner are also installed at this time in appropriate directories, e.g., WinNT\System32\.

Figure 3:
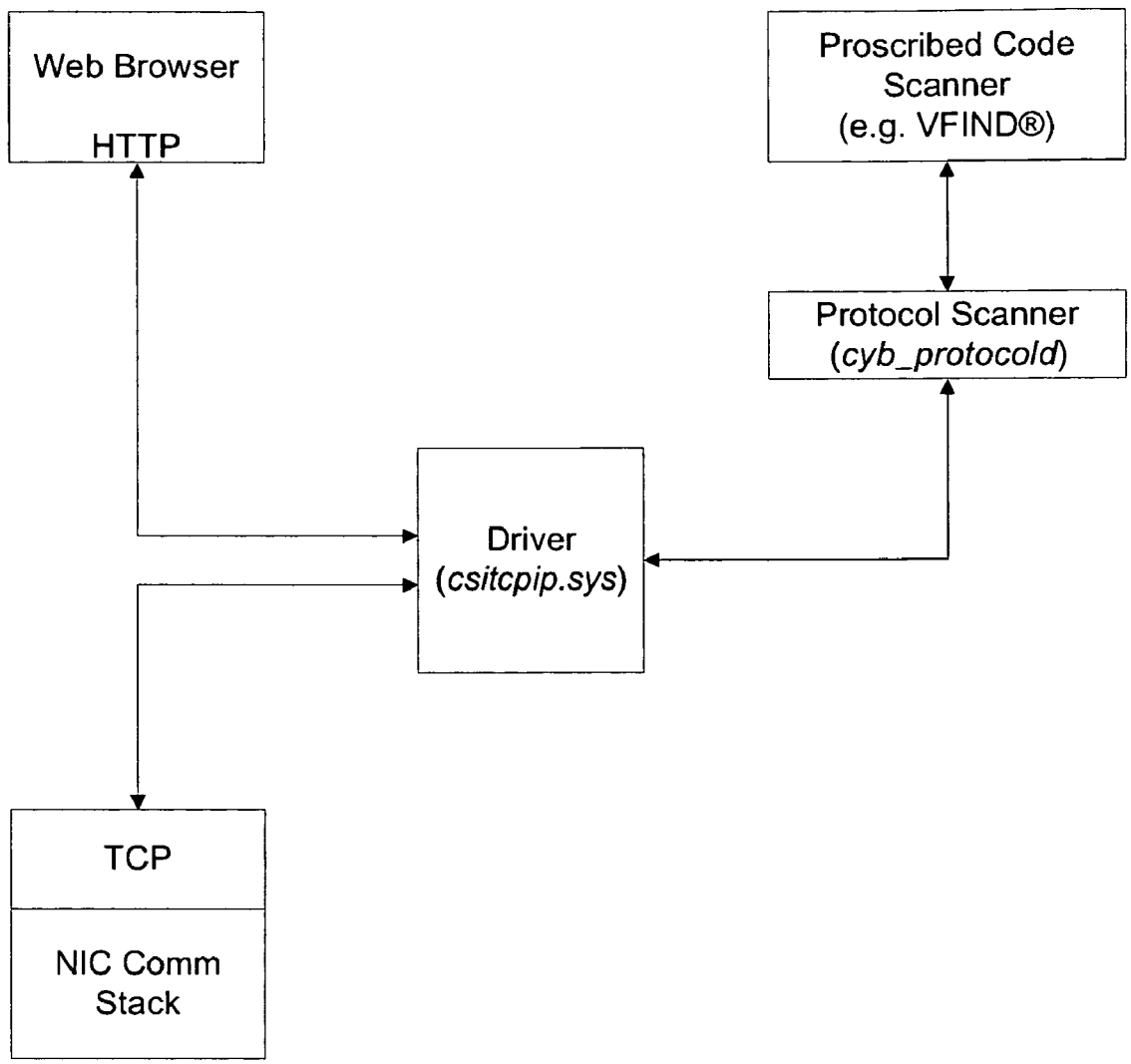
FIG. 3 is a schematic diagram of operation of a preferred embodiment.

After rebooting, csiservice.exe calls the driver, which in turn, will call the protocol scanner if code is transmitted through a communications stack which the driver has been configured to intercept. The interception settings and processes, which may be set in any of a number of ways, are as described above with regard to the UNIX® preferred embodiments. FIG. 3 shows an example of a process of a preferred WinNT embodiment intercepting code in a NIC communications stack.

It should be noted that various embodiments may process, that is, intercept, examine, and/or control any or all code streams transferred through any number of communication channels in a computer or network. Intercepting, examining and/or controlling code includes but is not limited to monitoring, blocking, logging, quarantining, discarding or transferring code. Embodiments can be ported to other Unix® and Unix®-like platforms, including but not limited to Linux® and its variants, as well as other operating system platforms including but not limited to Microsoft Windows® NT, Windows® 2000, Windows® 95, 98 and Me, IBM OS/390, MacOS, VxWorks® and others. The preferred embodiments may be used on a single machine, with a connection to another machine or system, network or the Internet. Preferred embodiments may also be used on a separate machine or system inserted in a communications channel, including but not limited to another computer, proxy server, firewall, router and the like.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An apparatus for intercepting and processing code on a communications channel comprising: a protocol parser that parses monitors for interception parameters passing through a communications channel based on parameters of the code passing through the communications channel; and, a proscribed code scanner; whereby said protocol parser intercepts said code traveling on said channel and transmits said code for review by said proscribed code scanner; said proscribed code scanner reviewing information preexisting in said code prior to said code being intercepted and process by said apparatus; whereby said scanner reintroduces to the communications channel all, some or none of the intercepted code.

2. An apparatus as in claim 1 further comprising a protocol scanner, whereby said protocol parser transmits said code to said proscribed code scanner through said protocol scanner.

3. An apparatus as in claim 2 whereby said proscribed code scanner further comprises a scanning means and an indicator means, whereby said indicator means provides an indication of the presence of proscribed code after scanning said intercepted code.

4. An apparatus as in claim 3, whereby said proscribed code scanner comprises a virus scanner.

5. An apparatus as in claim 2, wherein said protocol scanner further comprises a configuration means for configuring interception parameters.

6. An apparatus as in claim 1, wherein said protocol parser further comprises a configuration means for configuring interception parameters.

7. The apparatus of claim 1, wherein said scanner that reintroduces code to said communications channel reintroduces code that said scanner determines is not proscribed code, and wherein said reintroduced code comprises code containing the content upon which parsing with said protocol parser was based.

8. An apparatus for intercepting and processing code on a communications channel comprising: a protocol parser that monitors for interception parameters passing through a communications channel based on parameters of the code passing through the communications channel parses code based on the content of code received from said communications channel; a protocol scanner; and, a proscribed code scanner comprised of a scanning means and an indicator means; whereby said protocol parser transmits said code to said proscribed code scanner through said protocol scanner, and whereby said indicator means provides an indication of the presence of proscribed code after scanning said intercepted code.

9. A method for processing code on a communications channel comprising: intercepting said code; parsing said code with a parser via protocol parsing based on parameters of the code intercepted by said protocol parser from said communications channel; scanning said code for the presence of proscribed code; and, providing an indicator for the presence of said proscribed code, whereby scanning of said code scans said code for information which preexists in said code being intercepted and parsed.

10. A method as in claim 9 further comprising the step of: returning said code to said communication channel if said indicator is negative.

11. The method of claim 10, wherein said reintroduced code comprises code scanned by said scanner for which said indicator is negative, and wherein said reintroduced code contains the content upon which parsing with said protocol parser is based.

12. A method as in claim 9 further comprising the step of: further indicating the presence of said proscribed code if said indicator is positive.

13. A method as in claim 9 wherein the step of intercepting said code further comprises intercepting the code according to configured parameters.

14. A method as in claim 9 further comprising the step of providing a separate system inserted in said communications channel, and with at least one of said steps of intercepting said code; decrypting said code; scanning said code for the presence of proscribed code, and providing an indicator for the presence of said proscribed code, occurring on said separate machine.

15. A method as in claim 9 wherein the step of scanning said code for the presence of proscribed code further comprises scanning said code for the presence of viruses.

* * * * *